US008235221B2

(12) United States Patent
Taylor et al.

(10) Patent No.: US 8,235,221 B2
(45) Date of Patent: Aug. 7, 2012

(54) METHODS FOR VACUUM FILTRATION (75) Inventors: Thomas Taylor, Windham, NH (US);
Jeffrey F. Kane, Hudson, MA (US);
Vito Lore, Somerville, MA (US); Sean Landis Phillips, Lancaster, MA (US)

(73) Assignee: Roush Life Sciences, LLC, Livonia, MI (US)

( * ) Notice: Subject to any disclaimer, the term of this patent is extended or adjusted under 35 U.S.C. 154(b) by 1225 days.

(21) Appl. No.: 12/023,711

(22) Filed: Jan. 31, 2008

(65) Prior Publication Data
US 2009/0026126 A1     Jan. 29, 2009

Related U.S. Application Data (60) Provisional application No. 60/952,010, filed on Jul. 26, 2007, provisional application No. 60/952,011, filed on Jul. 26, 2007, provisional application No. 60/952,012, filed on Jul. 26, 2007, provisional application No. 60/952,013, filed on Jul. 26, 2007.

(51) Int. Cl.
*B01D 35/00* (2006.01)
(52) U.S. Cl. .................................................. 210/406
(58) Field of Classification Search ................ 210/406
See application file for complete search history.

(56) References Cited

U.S. PATENT DOCUMENTS

| | | | |
|---|---|---|---|
| 1,168,988 A | 1/1916 | Zimmermann | |
| 1,216,112 A | 2/1917 | Greven | 210/477 |
| 1,501,073 A | 7/1924 | Stead | 210/478 |
| 2,367,794 A | 1/1945 | Marselus | 210/159 |
| 2,460,423 A | 2/1949 | Kracklauer | 210/479 |
| 2,584,206 A | 2/1952 | Hodsdon | 210/445 |
| 2,608,843 A | 9/1952 | Kennedy et al. | 65/65 |
| 2,755,935 A | 7/1956 | Richards | 210/149 |
| 2,818,178 A | 12/1957 | Hodsdon | 210/445 |
| 3,010,583 A | 10/1959 | Kenyon | 210/406 |
| 3,085,705 A | 4/1963 | Varney | 215/41 |
| 3,286,866 A | 11/1966 | McIntosh | 215/40 |

(Continued)

FOREIGN PATENT DOCUMENTS
DE     403858     10/1924
(Continued)

OTHER PUBLICATIONS

European Patent Office, International Search Report and Written Opinion of the International Searching Authority—Application No. PCT/US2008/052647, dated Jun. 5, 2008 (11 pages).

(Continued)

*Primary Examiner* — Chester Barry
(74) *Attorney, Agent, or Firm* — Sunstein Kann Murphy & Timbers LLP (57) ABSTRACT

Liquid filter assemblies including an upper sample reservoir, a sample filter and a lower storage bottle are supported by a vacuum base. The base has a vacuum inlet port and, for connection to the liquid filter assembly, a vacuum outlet port. A vacuum is provided through the base to below the sample filter to draw sample liquid through the sample filter into the storage bottle. The base may include an auxiliary vacuum outlet port for connection with additional devices. The bases may be connected from one to another through auxiliary vacuum outlets and the vacuum inlets to make a chain of liquid filter assemblies supplied from one vacuum source. Alternatively, one base may include multiple vacuum outlet ports so that it may support and supply vacuum to a plurality of liquid filter assemblies.

11 Claims, 12 Drawing Sheets

U.S. PATENT DOCUMENTS

| | | | |
|---|---|---|---|
| 3,295,686 A | 1/1967 | Krueger | 210/455 |
| 3,319,792 A | 5/1967 | Leder et al. | 210/238 |
| 3,469,369 A | 9/1969 | Helmke | 95/259 |
| 3,478,889 A | 11/1969 | Fessler | 210/406 |
| 3,730,352 A | 5/1973 | Cohen et al. | 210/332 |
| 3,752,651 A | 8/1973 | Bush | 23/230 R |
| 3,838,978 A | 10/1974 | Eddleman et al. | 23/292 |
| 3,956,125 A | 5/1976 | Strutt et al. | 210/94 |
| 4,052,163 A | 10/1977 | Patzner | 23/259 |
| 4,247,399 A | 1/1981 | Pitesky | 210/341 |
| 4,251,366 A | 2/1981 | Simon et al. | 210/767 |
| 4,301,010 A | 11/1981 | Eddleman et al. | 210/406 |
| 4,357,240 A | 11/1982 | Mehra et al. | 210/455 |
| 4,394,266 A | 7/1983 | Mehra et al. | 210/244 |
| 4,468,321 A | 8/1984 | St. John | 210/232 |
| 4,521,308 A | 6/1985 | Brimhall, Jr. et al. | 210/330 |
| 4,523,934 A | 6/1985 | Joshua | 55/189 |
| 4,614,585 A | 9/1986 | Mehra et al. | 210/433.2 |
| 4,673,501 A | 6/1987 | Wells et al. | 210/406 |
| 4,678,572 A | 7/1987 | Hehl | 210/232 |
| 4,678,576 A | 7/1987 | Leoncavallo | 210/433.2 |
| 4,689,147 A | 8/1987 | Leoncavallo et al. | 210/232 |
| 4,702,834 A | 10/1987 | Relyea | 210/321.78 |
| D297,860 S | 9/1988 | Leoncavallo et al. | D24/8 |
| 4,783,318 A | 11/1988 | Lapakko | 422/101 |
| 4,792,398 A | 12/1988 | Klein | 210/406 |
| 4,832,842 A | 5/1989 | Limb | 210/232 |
| 4,849,061 A | 7/1989 | Relyea | 156/308.4 |
| 4,894,155 A | 1/1990 | Leoncavallo et al. | 210/321.84 |
| 4,944,876 A | 7/1990 | Miller | 210/321.75 |
| 5,112,484 A | 5/1992 | Zuk, Jr. | 210/247 |
| 5,116,496 A | 5/1992 | Scott | 210/232 |
| 5,141,639 A | 8/1992 | Kraus et al. | 210/321.75 |
| 5,205,989 A | 4/1993 | Aysta | 422/101 |
| 5,227,137 A | 7/1993 | Monti et al. | 422/101 |
| 5,234,585 A | 8/1993 | Zuk, Jr. | 210/188 |
| 5,264,184 A | 11/1993 | Aysta | 422/101 |
| 5,283,039 A | 2/1994 | Aysta | 422/104 |
| 5,308,483 A | 5/1994 | Sklar et al. | 210/232 |
| 5,375,477 A | 12/1994 | Neill et al. | 73/863.23 |
| 5,447,079 A | 9/1995 | Neill et al. | 73/863.23 |
| 5,603,900 A | 2/1997 | Clark et al. | 422/101 |
| 5,785,927 A | 7/1998 | Scott et al. | 422/104 |
| 5,792,425 A | 8/1998 | Clark et al. | 422/101 |
| 5,849,249 A | 12/1998 | Jones, Jr. et al. | 422/101 |
| 5,873,967 A | 2/1999 | Clark et al. | 156/70 |
| 5,948,246 A | 9/1999 | Zuk, Jr. | 210/188 |
| 6,159,368 A | 12/2000 | Moring et al. | 210/321.75 |
| 6,287,849 B1 | 9/2001 | McNerney et al. | 435/287.1 |
| 6,338,802 B1 | 1/2002 | Bodner et al. | 210/650 |
| 6,358,730 B1 | 3/2002 | Kane | 435/297.5 |
| 6,379,625 B1 | 4/2002 | Zuk, Jr. | 422/101 |
| 6,419,827 B1 | 7/2002 | Sandell et al. | 210/321.75 |
| 6,443,314 B2 | 9/2002 | Shiraiwa et al. | 210/474 |
| 6,451,261 B1 | 9/2002 | Bodner et al. | 422/99 |
| 6,458,278 B1 | 10/2002 | Leoncavallo et al. | 210/650 |
| 6,491,873 B2 | 12/2002 | Roberts et al. | 422/101 |
| 6,506,343 B1 | 1/2003 | Bodner et al. | 422/65 |
| 6,720,417 B1 | 4/2004 | Walter | 536/25.4 |
| 6,770,203 B2 | 8/2004 | Leoncavallo et al. | 210/650 |
| 6,783,732 B2 | 8/2004 | Madden et al. | 422/63 |
| 6,913,152 B2 | 7/2005 | Zuk, Jr. | 210/406 |
| 6,951,762 B2 | 10/2005 | Zuk, Jr. | 436/180 |
| 6,986,849 B2 | 1/2006 | Irvine | 210/791 |
| 7,011,755 B2 | 3/2006 | Zuk, Jr. | 210/416.1 |
| 7,798,333 B2 * | 9/2010 | Zuk, Jr. | 210/406 |
| 2002/0096468 A1 | 7/2002 | Zuk, Jr. | 210/455 |
| 2002/0098125 A1 | 7/2002 | Roberts et al. | 422/101 |
| 2003/0010708 A1 | 1/2003 | Leocavallo et al. | 210/477 |
| 2003/0080045 A1 | 5/2003 | Zuk, Jr. | 210/416.1 |
| 2005/0023172 A1 | 2/2005 | Ide et al. | 206/446 |
| 2005/0178216 A1 | 8/2005 | Pitt et al. | 73/863.23 |
| 2007/0144959 A1 * | 6/2007 | Zuk, Jr. | 210/473 |

FOREIGN PATENT DOCUMENTS

| | | |
|---|---|---|
| DE | 33 06 599 | 8/1984 |
| EP | 0 075 687 | 4/1983 |
| EP | 0 857 961 A2 | 8/1988 |
| EP | 0 223 323 | 5/1990 |
| EP | 0 618 833 | 12/1992 |
| EP | 1 031 371 | 8/2000 |
| EP | 1 145 752 | 10/2001 |
| GB | 2 250 927 | 6/1992 |
| WO | WO 93/12853 | 7/1993 |
| WO | WO 95/04585 | 2/1995 |
| WO | WO 98/32875 | 7/1998 |
| WO | WO 2007/028157 | 3/2007 |

OTHER PUBLICATIONS

The International Bureau of WIPO, International Preliminary Report on Patentability—Application No. PCT/US2008/052647, dated Jan. 26, 2010 (8 pages).

* cited by examiner

METHODS FOR VACUUM FILTRATION

The present application claims priority from U.S. Provisional Application No. 60/952,010, entitled "Vacuum Bottle", No. 60/952,011, entitled "Vacuum Base," No. 60/952,012, entitled "Vacuum Collar," and No. 60/952,013, entitled "Vacuum Controller," all of which were filed Jul. 26, 2007 and the full disclosures of which are hereby incorporated by reference herein. The present application is related to applications with the following titles and attorney docket numbers, "Methods and Apparatus for Foam Control in a Vacuum Filtration System," Ser. No. 12/023,685; "Methods and Apparatus for Supporting a Vacuum Filtration Device," Ser. No. 12/023,820; "Method and Apparatus for Filtrate Storage Handling," Ser. No. 12/023,757, all filed on the same date herewith, the full disclosures of which are hereby incorporated by reference herein.

FIELD OF THE INVENTION

The present invention relates to liquid filtration, and particularly to a vacuum base for a vacuum filtration system for filtering liquid samples.

BACKGROUND ART

Entities such as pharmaceutical companies and university research labs commonly use vacuum filtration sterilization of biological fluids such as cell culture media and buffer solutions. This typically involves what are referred to as bottle-top filters such as the three-piece example shown in FIG. 1. A bottle-top filter device 10 includes an upper unfiltered sample reservoir 11 which is removable and disposable. The sample reservoir 11 includes a filter 12 which typically includes a polyethersulfone (PES) or cellulose-based membrane for sterilized filtering of the sample liquid. The upper rim of the sample reservoir 11 may receive a removable cover that protects the sample liquid from contamination. On the bottom is a filtrate storage bottle 13 for collecting the liquid filtrate, and in between is a vacuum collar 14 with a vacuum port for manual coupling of a vacuum source. Vacuum is applied downstream of the filter 12 to create a pressure differential which draws the sample liquid through the filter into the storage bottle 13. The upper rim of the storage bottle 13 may be adapted to receive a cap to close the container after filtering once it is disconnected from the vacuum collar 14. These components are normally sold pre-sterilized.

Figure 1:
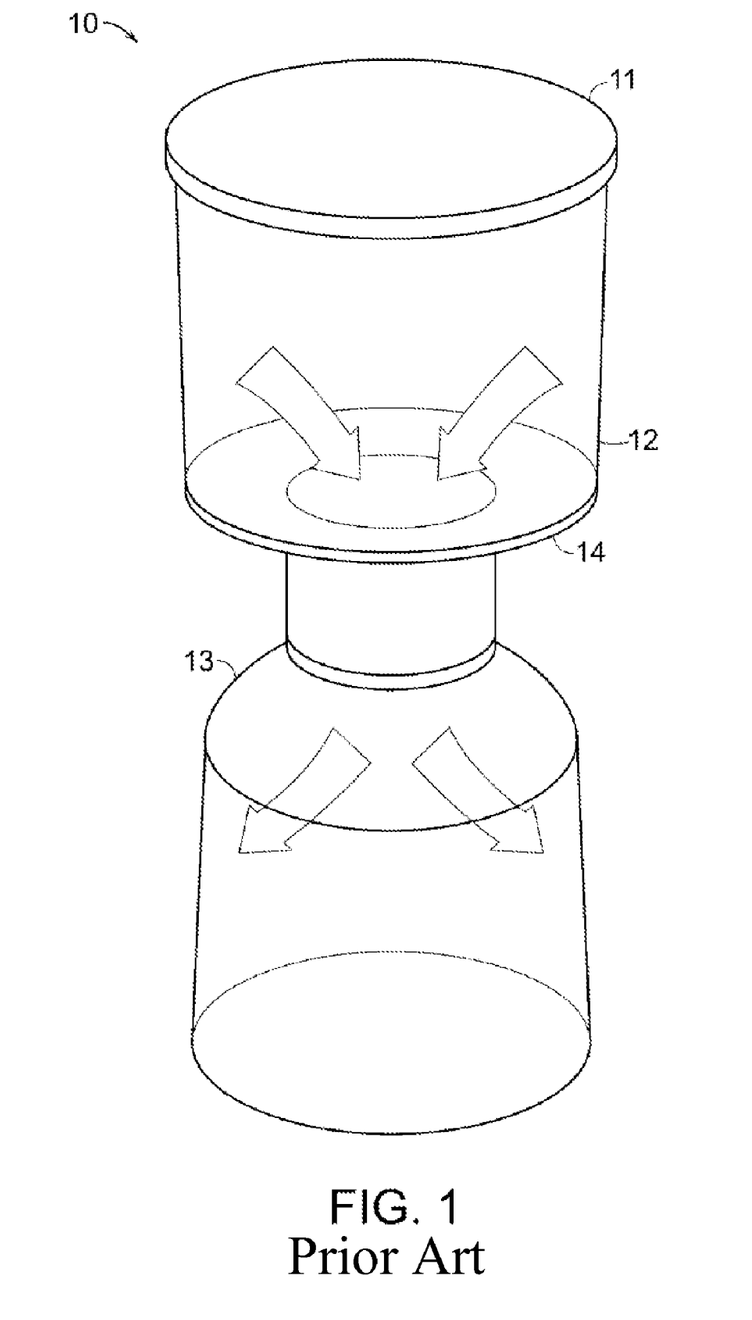
FIG. 1 shows an example of a bottle-top filter device according to the prior art.

Such products and processes have various inherent challenges. For example potential spills are a significant concern. A spill can disrupt production for up to an entire day and require use of a sanitizing laminar hood. Moreover, the bottle-top filter device 10 of FIG. 1 is top heavy, especially when first filled with sample liquid, making the device unstable and prone to tipping. The need for manual attachment of the vacuum source to the vacuum port of the vacuum collar 14 creates further problems with instability. These issues can lead to greater risk of spillage, increased setup time, and a need for full-time supervision.

SUMMARY OF THE INVENTION

A liquid filtering assembly has an upper sample reservoir for receiving a volume of sample liquid. A sample filter is positioned proximate a bottom of the sample reservoir for mechanically filtering the sample liquid. A lower storage bottle receives filtered sample liquid from the sample reservoir. A vacuum collar disposed between the sample reservoir and the storage bottle serves to draw sample liquid through the sample filter into the storage bottle. A base provides a conduit for conducting a vacuum from a vacuum inlet port on the base to a vacuum outlet port in fluid communication with the vacuum collar. The base may be advantageously weighted to reduce risk of tipping over. Auxiliary vacuum outlet ports may be included in the system to provide vacuum to additional devices. Such auxiliary vacuum outlet ports may be located, for example, in a weighted bottom of the base. The auxiliary outlet ports facilitate systems with multiple liquid filtering assemblies. The vacuum may be connected from one base to another or from one vacuum base to one or more liquid filtering assemblies. The base may include an arm of adjustable height to accommodate filtering assemblies of differing sizes.

Multiple liquid filtering assemblies may alternatively be accommodated by a base of the present invention adapted to receive and support a plurality of liquid filtering assemblies. The conduit in such a base would conduct the vacuum into communication with each of the filter assemblies in the plurality of liquid filter assemblies.

In accordance with embodiments of the invention, the vacuum outlet port on a base is arranged in a cradle for connection to a liquid filter assembly. Registration features on the cradle orient the filter assembly in a single fixed radial direction to ensure alignment of the vacuum outlet port with an opening in the vacuum collar to receive the vacuum.

According to a further embodiment of the invention, a base supporting multiple liquid filter assemblies may be provided with a plurality of cradles. Each cradle includes a vacuum outlet port. At least one support arm has a fluid conduit therethrough that connects the vacuum inlet port to the vacuum outlet ports. In other embodiments, the orientation relative to vertical of the cradles may be adjusted. In one embodiment, the at least one support arm is flexible. In another embodiment, the cradle is pivotable with respect to its support arm.

Methods of the present invention connect a vacuum to a plurality of liquid filter assemblies. In accordance with one method, a vacuum source is connected to a vacuum inlet on a base. A plurality of liquid filter assemblies are supported on the base in fluid communication with the vacuum inlet. In accordance with another method, a base supports one liquid filter assembly. A connection is made between an auxiliary vacuum outlet on the base with a vacuum inlet on a second base. A second liquid filter assembly is supported on the second base in fluid communication with the vacuum inlet of he second base. Thus, it is not necessary to clutter a workspace with multiple connections and hoses back to a vacuum source.

Other objects and advantages of the present invention will become apparent during the following description of specific embodiments of the invention, taken in conjunction with the drawings.

BRIEF DESCRIPTION OF THE DRAWINGS

FIG. 3b is a magnified section of the vacuum collar of FIG. 3a.

FIG. 3c is a side cross-sectional view of the vacuum collar of FIG. 3a.

FIG. 3d is a side cross-sectional view taken through the vacuum port on the vacuum collar of FIG. 3a.

DETAILED DESCRIPTION OF SPECIFIC EMBODIMENTS

Figure 2:
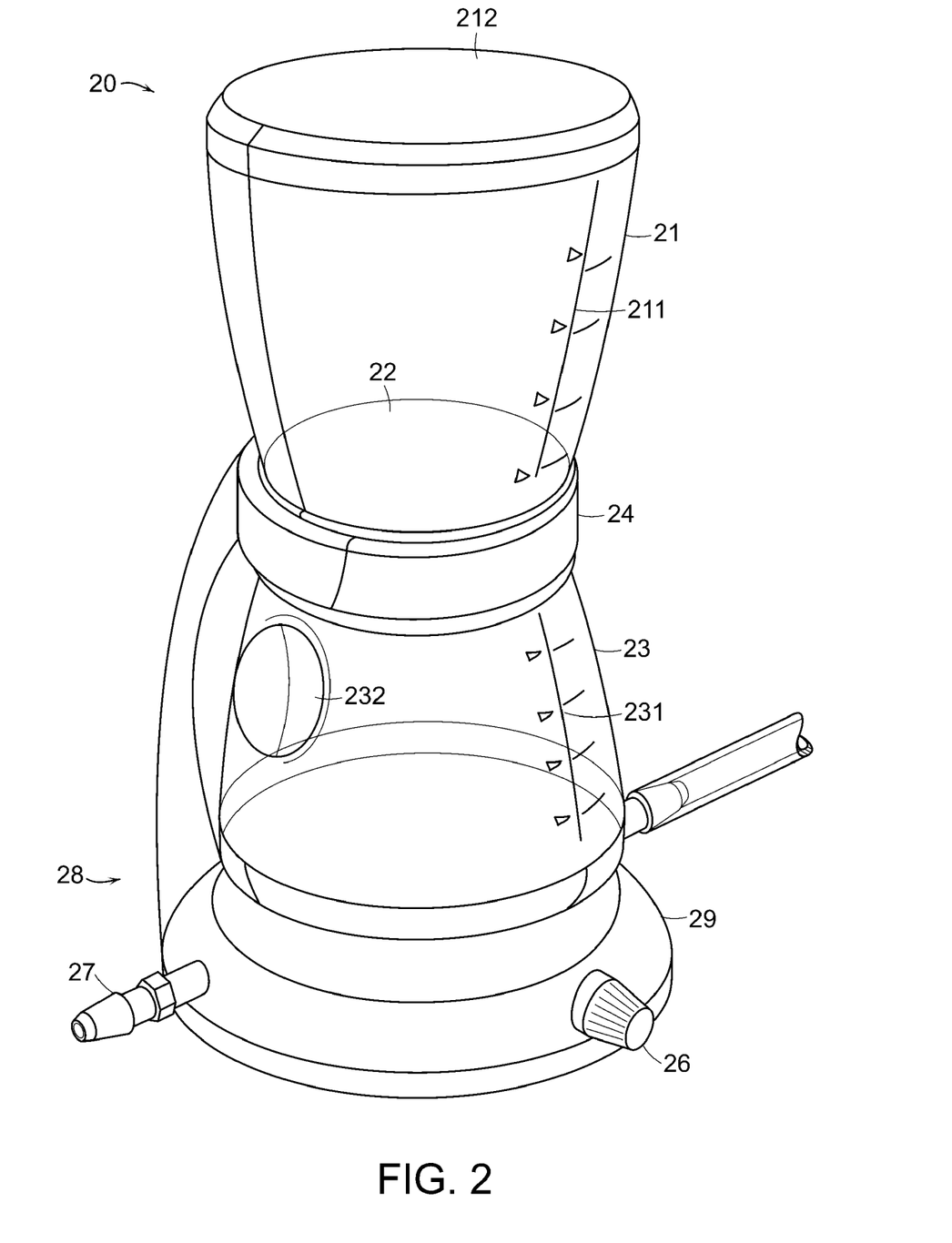
FIG. 2 is a perspective view of a liquid filtration system.
Figure 3A:
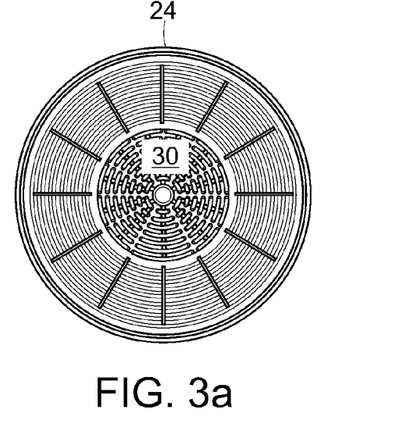
FIG. 3a is a plan view of a vacuum collar.
Figure 3B:
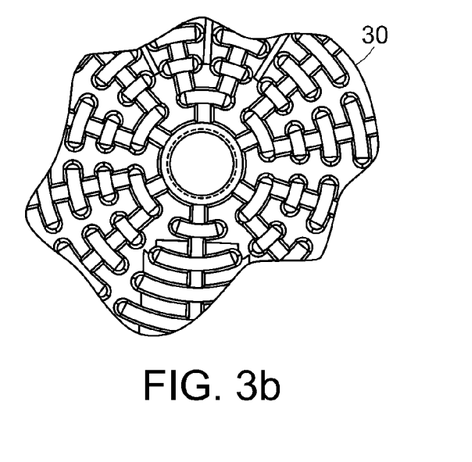
Figure 3C:
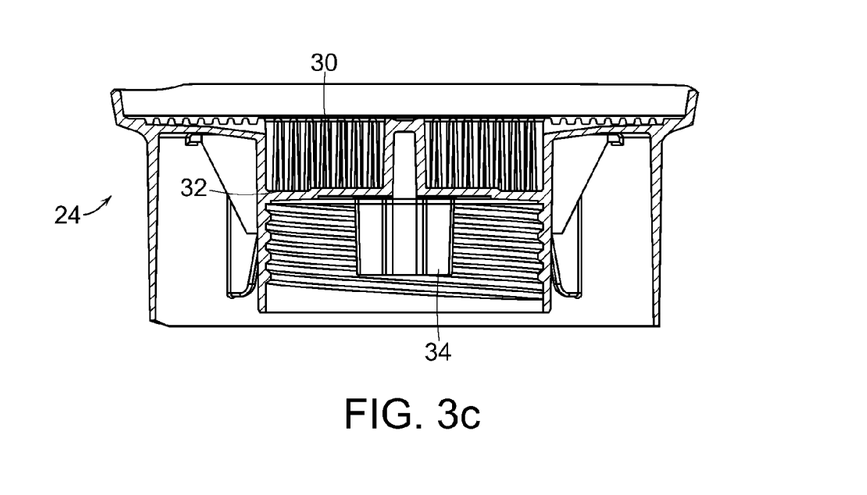
Figure 3D:
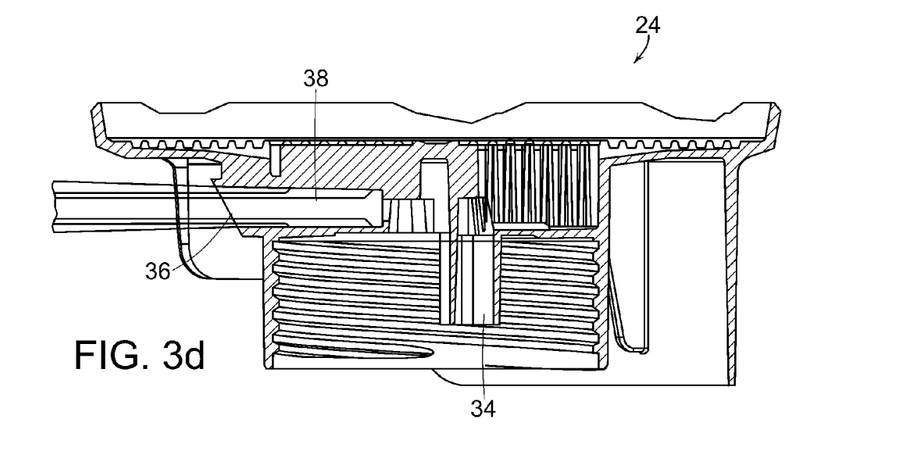

Referring now to FIG. 2, a liquid filtration system 20 includes a vacuum bottle 23. The vacuum bottle 23 is connected by a vacuum collar 24 to an upper sample reservoir 21, which together form a unified filter assembly. The sample reservoir 21 receives a volume of unfiltered sample liquid and has at its inner bottom a sample filter 22 for mechanically filtering the sample liquid. The vacuum collar 24 is disposed between the sample reservoir 21 and the storage bottle 23 for applying a vacuum to an underside of the sample filter 22 which draws sample liquid through the sample filter into the storage bottle. The vacuum collar 24 provides a flat top plane on which the filter is supported. The flat top plane must nevertheless have openings through which the filtered liquid is pulled.

As shown in FIGS. 3a-3d, one structure for providing the openings and the support is a maze of vanes 30. The top edges of the vanes 30 support the filter and the liquid may be pulled down between the vanes. A solid bottom layer 32 covers a substantial portion of the maze of vanes 30. An open outlet chute 34 provides the only fluid communication between the sample reservoir 21 and the vacuum bottle 23. Thus, fluid is funneled from the vanes 30 into the outlet chute 34. An assembly vacuum port 36 is provided out the side of the vacuum collar 24 for connection with a source vacuum. A passage 38 from the assembly vacuum port 36 connects the vacuum to a volume below the solid bottom layer of the collar. The vacuum is directed into the vacuum bottle 23 for pulling liquid through the outlet chute 34 into the vacuum bottle. The vacuum storage bottle 23, thus, receives filtered sample liquid from the sample reservoir 21.

The filter assembly is secured to a base 28. The base 28 includes a weighted bottom 29 to prevent the liquid filtration system from tipping over and to provide a stable support to the filter assembly which minimizes the potential for spills and accidents. The base 28 receives an inserted filter assembly and secures it in a stable position.

The base 28 also couples the vacuum to the vacuum collar 24. A source vacuum is provided to the base through a vacuum inlet port 27. Within the base, a fluid conduit provides a path for the vacuum that extends up through the support arm 25 to a vacuum outlet port 84 in a cradle 85 for mating with the vacuum collar 24. To accommodate filter assemblies of different sizes, the support arm 25 may be made so that it is adjustable in height. For example, the support arm 25 may be made with multiple extensions that telescope in or out to a setting as adjusted by the user.

Splashing within the storage bottle 23 and thus foaming can be minimized by adjusting the vacuum so as not to draw the fluid too vigorously down into the storage bottle 23. A vacuum controller 26 is included in an embodiment of the invention to allow a user to reduce the vacuum to reduce or eliminate foaming due to an overly vigorous flow. The controller regulates the vacuum to the vacuum collar 24 to precisely control pressure within the storage bottle 23. The vacuum controller 26 has a detented OFF position when it is turned fully counter-clockwise, which vents the system to atmosphere or otherwise shuts off the vacuum so that no vacuum pressure is applied to the vacuum collar 24. An initial low vacuum ON position is created by turning the vacuum controller 26 from the OFF detent clockwise about 5-15° to start applying a low vacuum to the vacuum collar 24 and create a small amount of negative pressure in the storage bottle 23. This creates an initial pressure differential across the sample filter 22 to start pulling sample liquid through the filter into the sample bottle. Continuing to turn the vacuum controller 26 further clockwise increases the vacuum to the vacuum collar 24 until some maximum source vacuum is reached when turned a full 180° clockwise. The vacuum controller 26 can work with as little as 5" Hg source vacuum up to maximum vacuum (i.e. 29.9" Hg). Any negative pressure beneath the sample filter will accelerate fluid flow down through the filter. Mechanisms for vacuum control are well known in the art. Any such controllers including diaphragm vacuum regulators, needle valve meters or other vacuum regulators may be used within the scope of the present invention.

Referring now to the liquid filter assembly, the sample reservoir 21 is an easy to use design that cooperates with the other elements of the system for an easy drop-in to the base 25 that is intuitive and requires no additional step to dock into place. The front of the sample reservoir 21 has accurate, easy to read graduation marks 211 that face the front when the filter assembly is docked in the base 28 for easy and reliable measurements. The sample filter 22 at the bottom of the sample reservoir 21 covers the filter support, whether it be the maze of vanes or other construction. On top of the sample reservoir 21 is a removable reservoir cap 212. Liquid to be filtered can be added with the reservoir cap 212 removed. The bottom of the sample reservoir 21 is adapted (e.g., threaded) for easy connect and disconnect to the vacuum collar 24.

Figure 4:
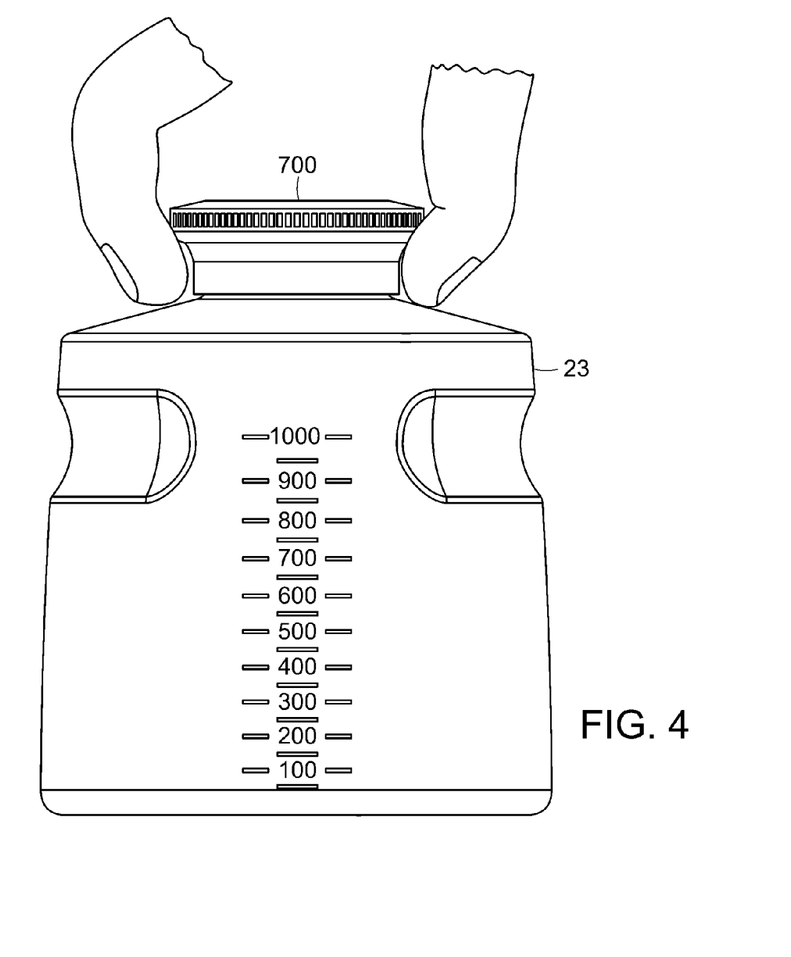
FIG. 4 shows a bottle storage cap.

The storage bottle 23 has similar features to minimize spills and accidents. The sides of the storage bottle may include opposing flat gripping surfaces 232 for secure handling. After filtering a sample, the storage bottle 23 may be disconnected from the vacuum collar 24. As shown in FIG. 4, the storage bottle 23 may be covered with a bottle cap 700, which has a large lip that allows for easy vertical pick-up, for example, for when the storage bottle 23 is in a water bath. The top surface of the bottle cap 700 is flat and easy to use for writing and labeling. The storage bottle 23 may come in various different sizes, e.g., 250 ml, 500 ml, 1000 ml. The front of the storage bottle 23 has accurate, easy to read graduation marks 231 that face the front when the filter assembly is docked in the base 28 for easy and reliable measurements. The top of the storage bottle 23 is adapted (e.g., threaded) for easy connect and disconnect to the vacuum collar 24.

Figure 5:
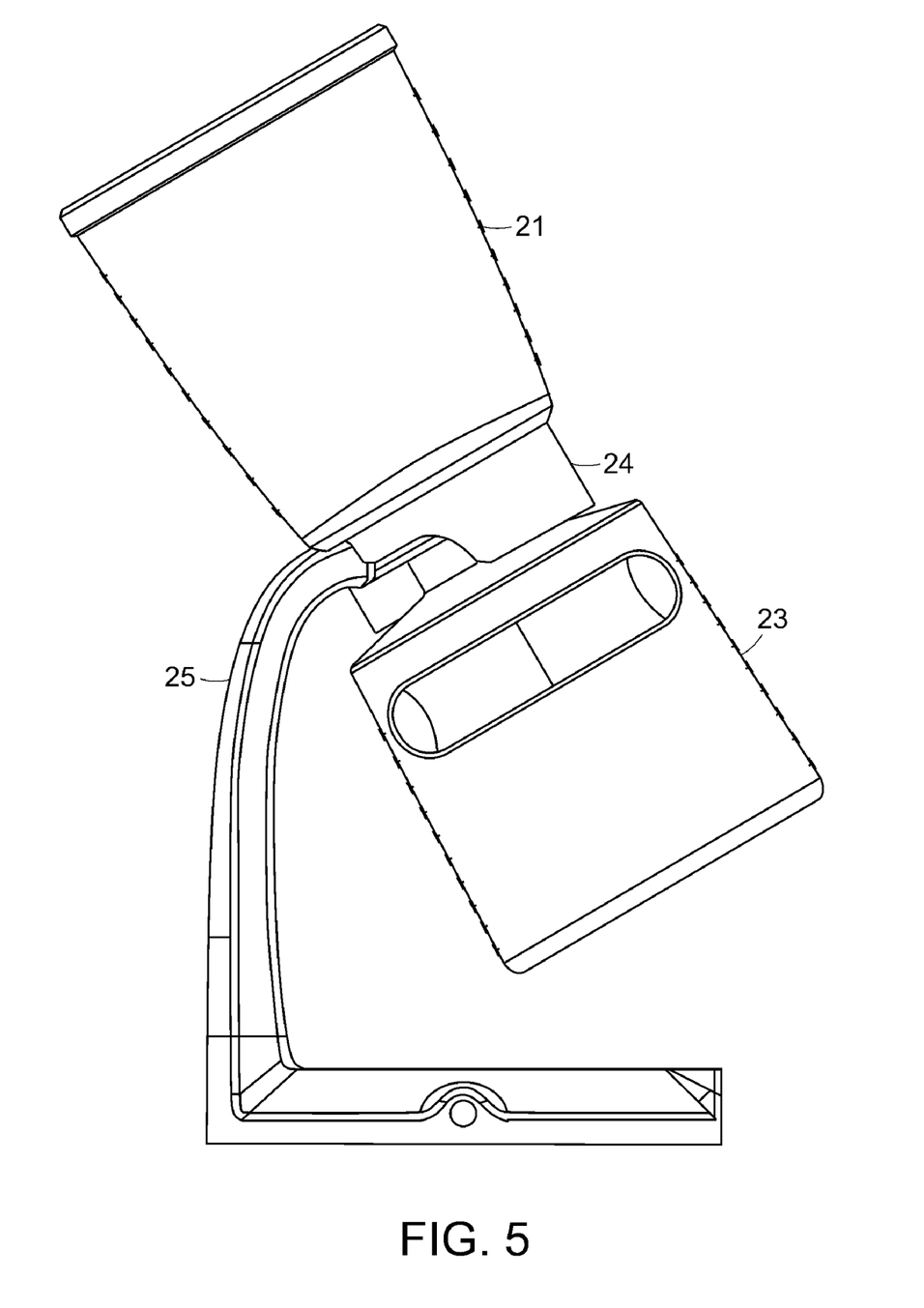
FIG. 5 shows a liquid filtration system with components that are adapted to operate at a non-vertical angle.

In addition to or alternatively to vacuum regulation, foaming can be reduced by causing liquid drawn through the filter to flow along a sidewall of the storage bottle 23. This can be accomplished by tilting the liquid filtration assembly to a non-vertical angle during the filtering process. By flowing along the sidewall the liquid is less likely to splash as compared with falling vertically down into a pool of collected liquid sample. As shown in FIG. 5, the system components may be adapted to operate at a non-vertical angle. Flexibility may be provided in the support arm 25 to permit adjustment of the angle of the liquid filter assembly. Bending of the support arm 25 may accomplish moving the cradle 85 to a new angular position. In the alternative, the cradle 85 may be pivotable with respect to the support arm to adjust the angle of the liquid filter assembly. For example, the cradle 85 may attach to the support arm 25 by means of a universal joint.

Figure 6A:
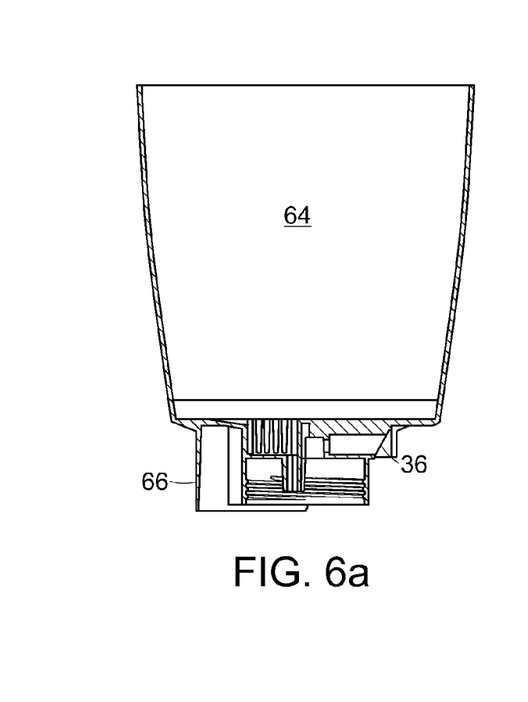
FIGS. 6A-C show an embodiment in which the sample reservoir and the vacuum collar are a single integral structure.
Figure 6B:
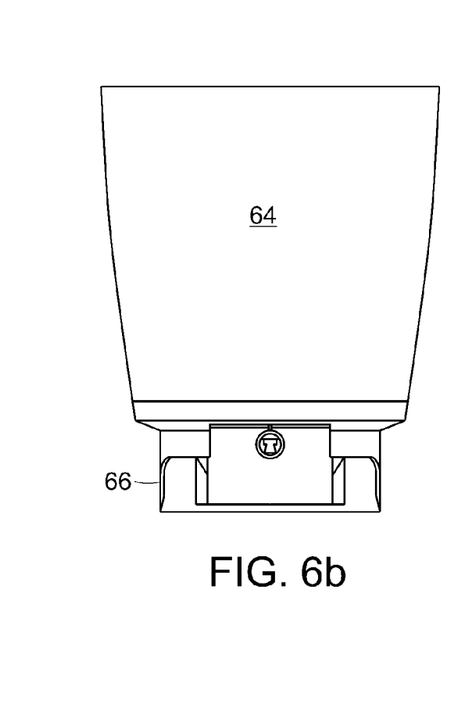
Figure 6C:
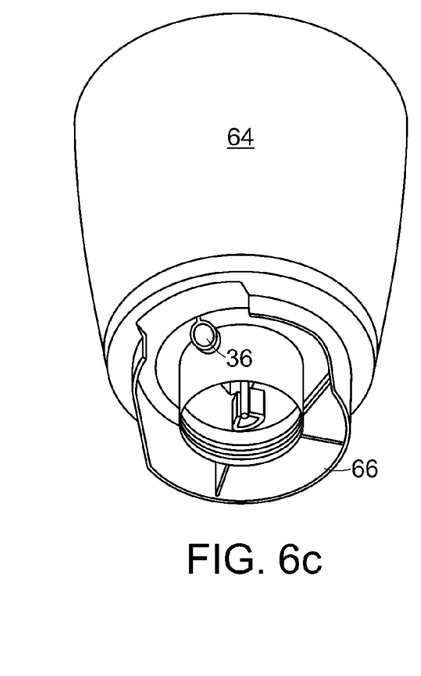

FIG. 6A-C shows an alternative embodiment in which a sample reservoir 64 and a vacuum collar 66 are a single integral structure. An assembly vacuum port 36 provides fluid communication to beneath the sample filter so as to draw liquid through the filter into a connected storage bottle below. In other embodiments, other structures may be unified together into similar common compound structures. For example, the vacuum collar and the storage bottle may form a single common structure.

Figure 7A:
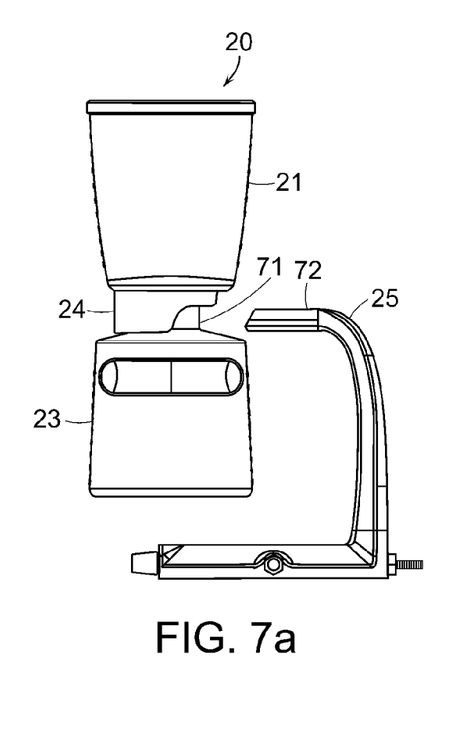
FIGS. 7A-C illustrate docking of a liquid filter assembly onto a base.
Figure 7B:
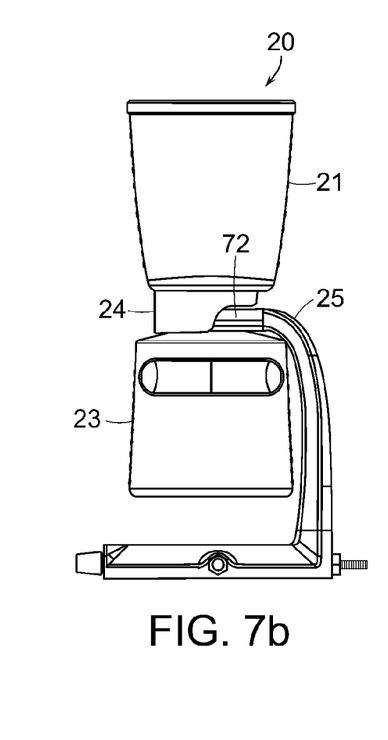
Figure 7C:
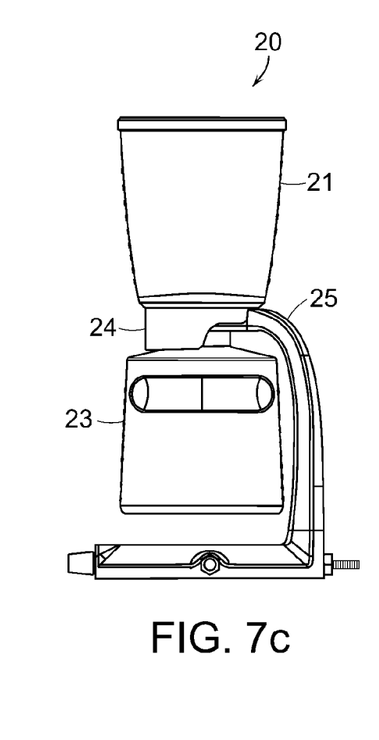
Figure 8A:
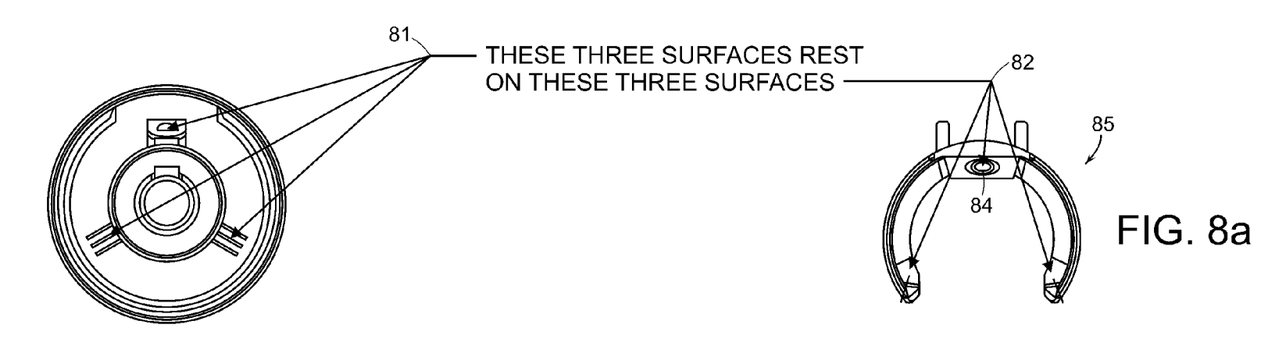
FIGS. 8A and 8B illustrate registration of the vacuum collar with the cradle.
Figure 8B:
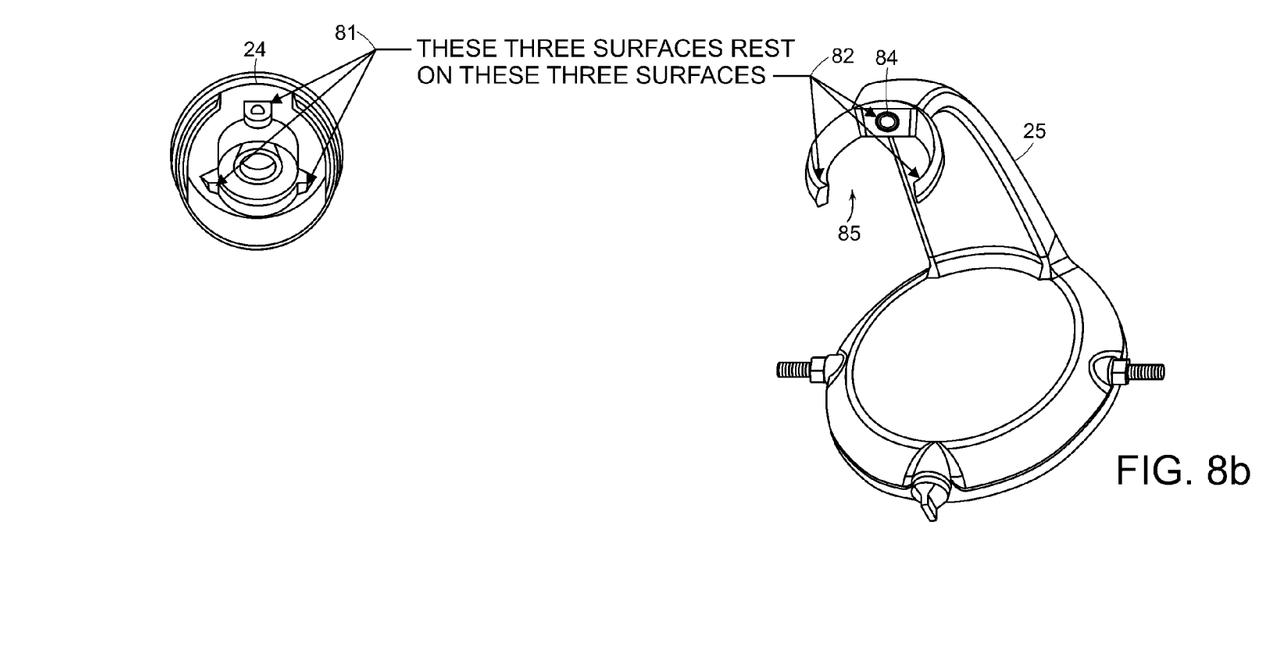

As shown in FIGS. 7 and 8, an embodiment of the present invention may include registration features 81 and 82 for orienting an inserted filter assembly 20 in a single fixed radial direction. As shown in FIG. 7A, the filter assembly 20 may include a loading channel 71 having within it a set of registration features 81. The base 28 would include a cradle 85 having corresponding registration features 82. The filter assembly 20 is docked on the base 28 by lowering the loading channel 72 over the cradle 85, FIG. 7B. The collar 24 has an open area that fits over the support arm 25 and facilitates aligning the registration features 81 and 82. The collar 24 guides the filter assembly 20 onto the cradle 85 until the registration features mate, FIG. 7C. Once in place, the vacuum outlet port 84 is automatically aligned with and sealed against a mating port 36 on the vacuum collar 24 so that the vacuum provided through the fluid conduit in the base is in communication with the liquid filter assembly 20. An O-ring or similar annular gasket on the vacuum outlet port 84 effectively seals the mated vacuum ports. The ports are beveled so that the weight of the filter assembly urges the ports together to form a more effective seal. This process can quickly and easily be performed one handed to provide convenient "load and go" functionality.

Figure 9:
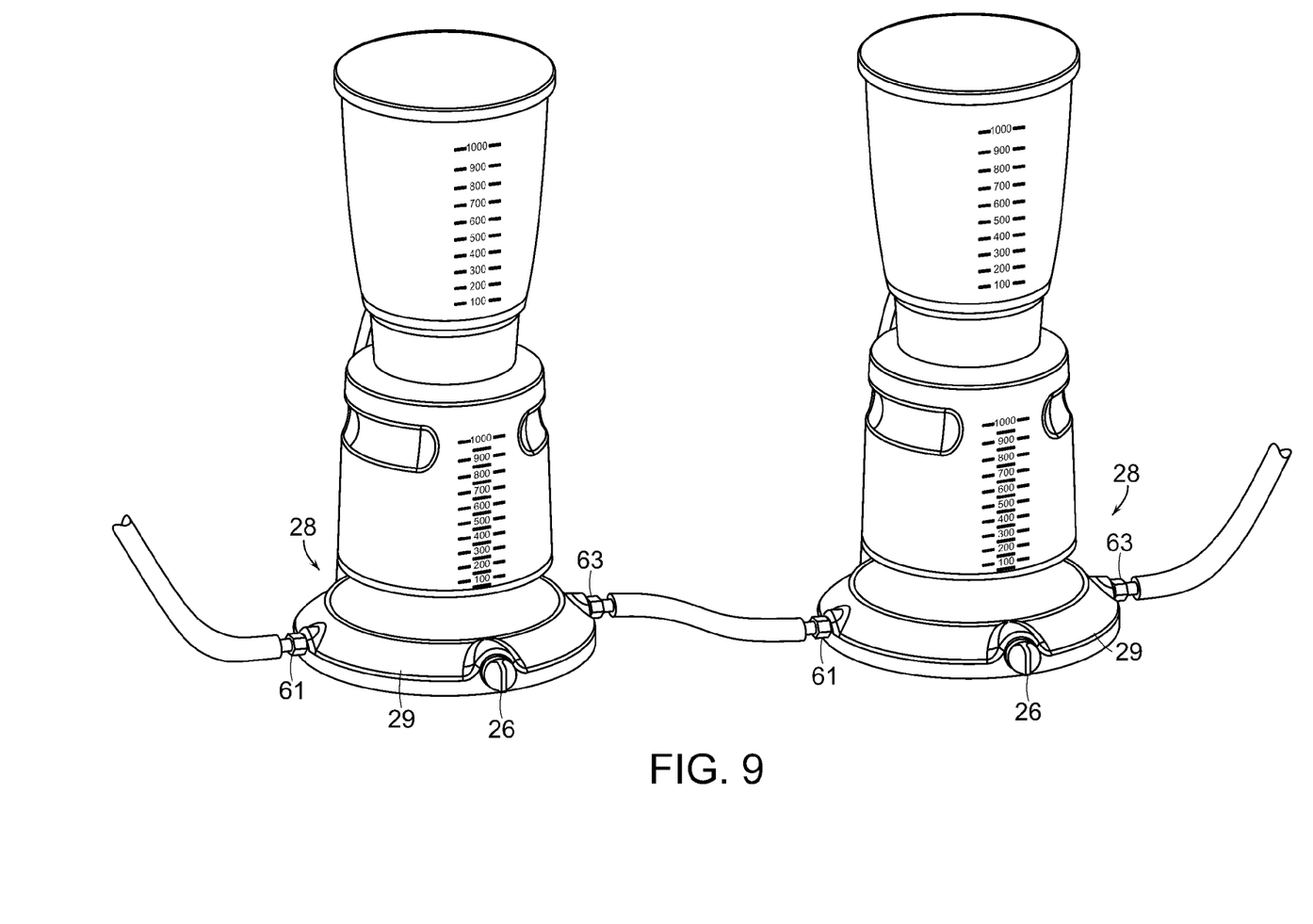
FIG. 9 shows a liquid filtration system with a chain of bases connected according to an embodiment of the invention.

In accordance with embodiments of the present invention, a variety of methods and systems are provided for connecting a vacuum to multiple liquid filter assemblies. In one embodiment, the liquid filtering system may include additional vacuum ports. As shown in FIG. 9, the base 28 includes a vacuum inlet port 61 for connection to a vacuum source. Multiple auxiliary vacuum outlet ports 63 allow for sharing the vacuum with other devices. For example, a hose may connect an auxiliary vacuum outlet 63 to a second base 28 supporting a second liquid filter assembly. The chain of bases may continue so long as there is sufficient vacuum. The fluid conduit in the base is extended through the bottom so as to interconnect any auxiliary vacuum outlet ports 63 with the vacuum inlet port 61. The use of auxiliary vacuum outlet ports 61 reduces the number of bench top hoses and fittings which minimizes clutter and increases the amount of usable work space. Instead of a hose from the source for each assembly, multiple assemblies can be supplied a vacuum with only one such hose to the source. The number of assemblies that can be operated off a single source is determined by the strength of the source and the required vacuum at each assembly to pull liquid filtrate through the sample filters.

Figure 10:
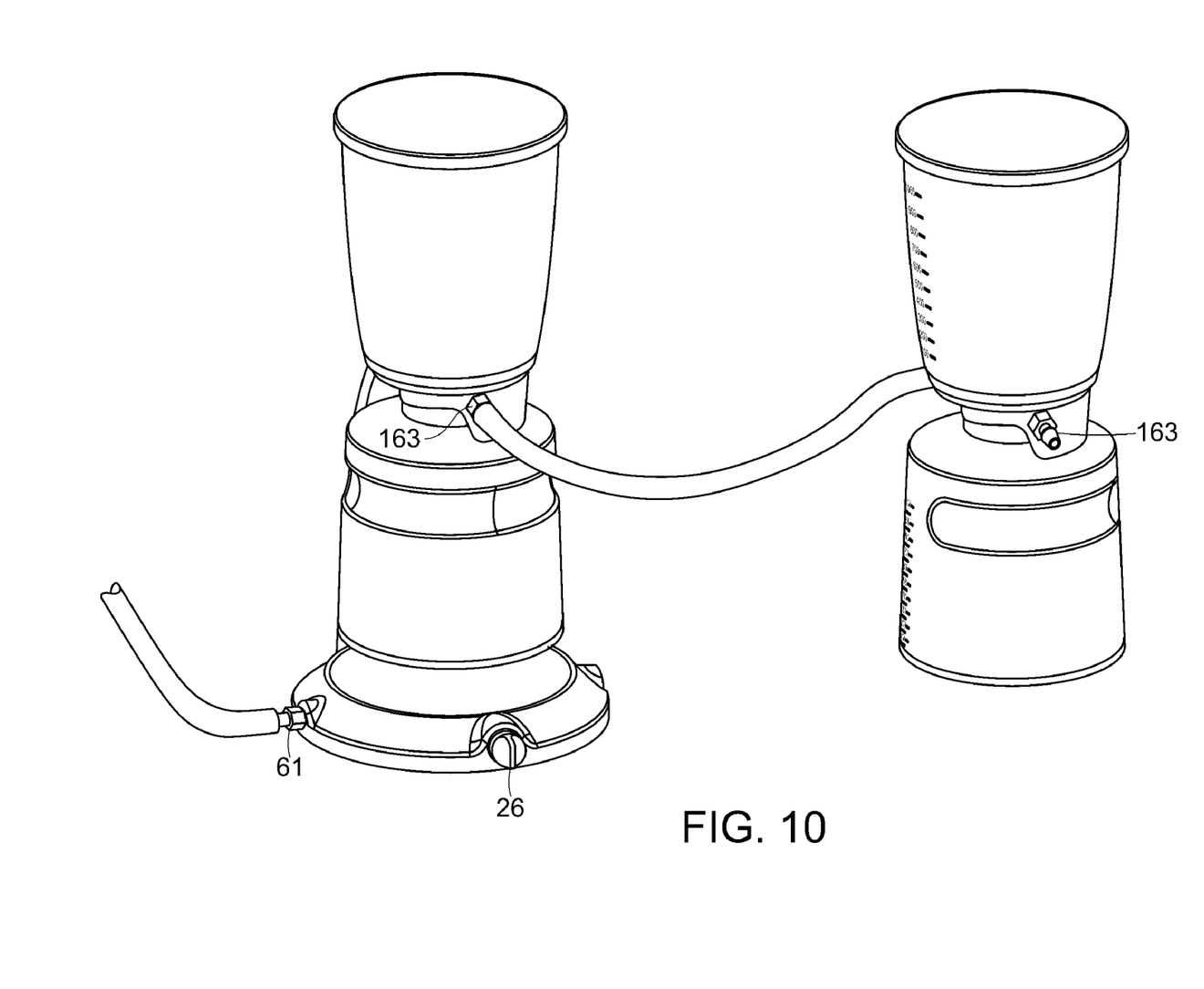
FIG. 10 shows a liquid filtration system with a chain of liquid filter assemblies connected according to an embodiment of the invention.
Figure 11:
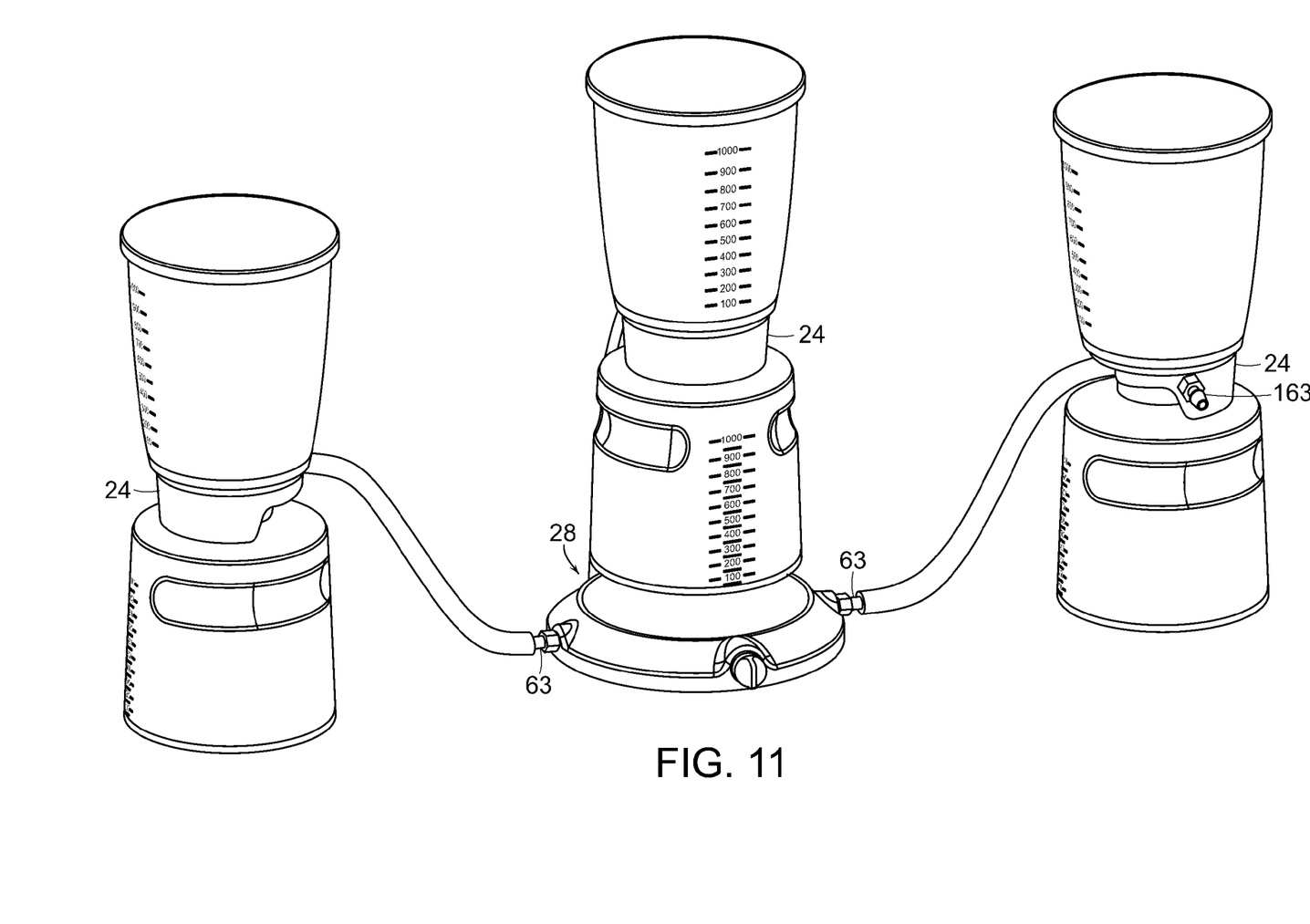
FIG. 11 shows a liquid filtration system in accordance with a further embodiment of the invention.

Instead of or in addition to auxiliary vacuum outlet ports on the base, such outlet ports may be provided on the vacuum collars 24. Referring to FIG. 10, auxiliary vacuum outlet ports 163 tap the vacuum from within the vacuum collar 24. Thus, a chain of liquid filter assemblies could be connected by hoses that interconnect auxiliary vacuum outlet ports 163 on the vacuum collars. Alternatively, as shown in FIG. 11, connections between bases 28 and vacuum collars 24 can be mixed. Here, auxiliary vacuum outlet ports 63 on a base 28 connected to auxiliary vacuum outlet ports 163 on vacuum collars 24 of other liquid filter assemblies. A vacuum source can be connected to a vacuum inlet port 61 (not shown) on the base 28. Alternatively, the vacuum source can be connected to one of the auxiliary vacuum outlet ports 163 on a vacuum collar 24.

Figure 12:
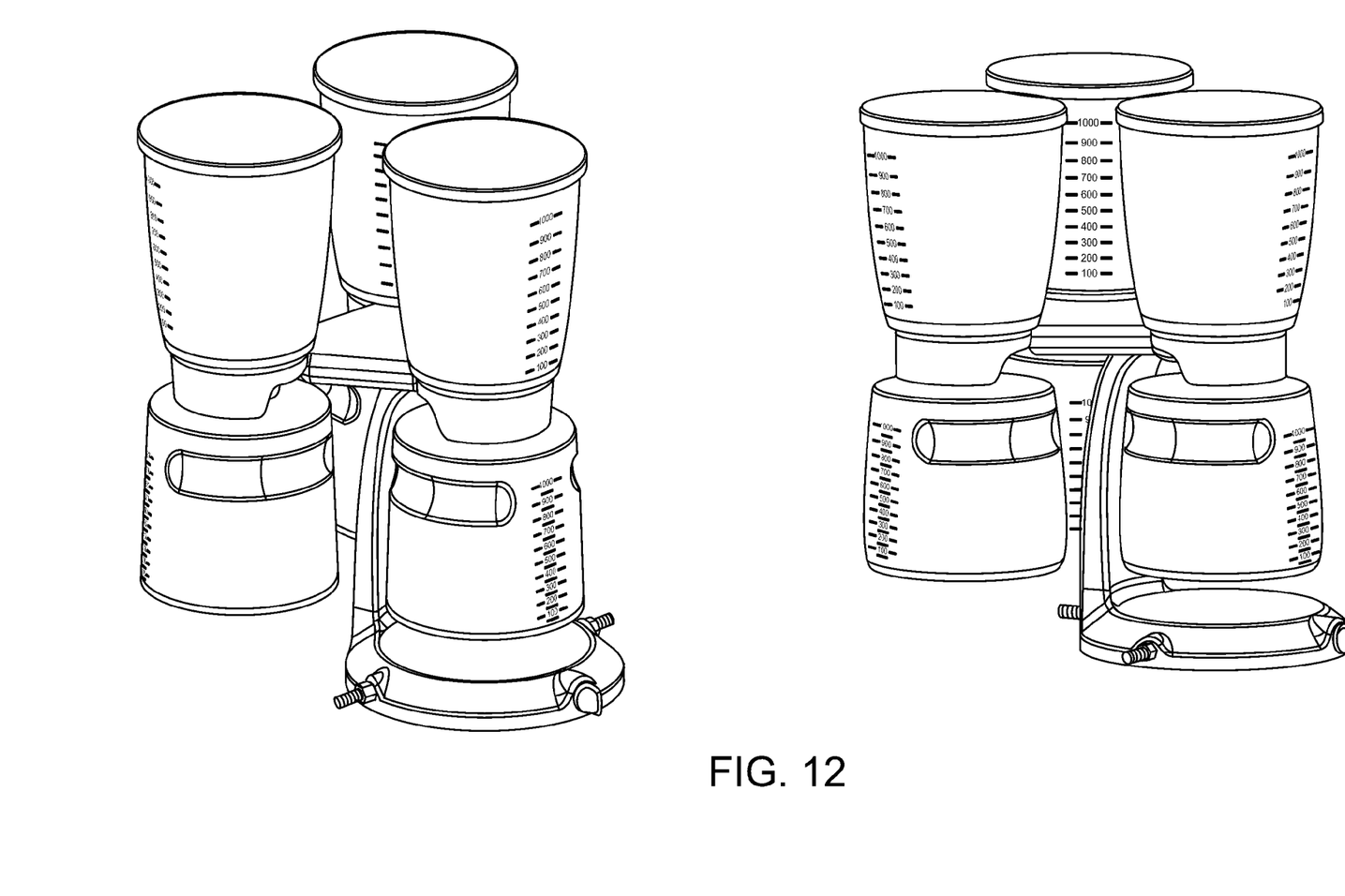
FIG. 12 shows a liquid filtration system with a base that holds a plurality of liquid filter assemblies.

A still further embodiment for conveniently providing vacuum to a plurality of liquid filter assemblies is shown in FIG. 12. A base 28 is provided with a support arm 25 that can support a plurality of liquid filter assemblies. A fluid conduit through the base 28 is directed through the support arm 25 each of the vacuum outlet ports 84 for making connection with a liquid filter assembly. The support arm 25 can hold multiple cradles 85 for docking the liquid filter assemblies. The base would have a bottom 29 sufficiently weighted to reduce risk of tipping over. A vacuum inlet port 61 receives a hose connected to a vacuum source, thereby providing a vacuum to each of the liquid filter assemblies docked on the base's support arm 25. In alternative embodiments, a base 28 may include multiple support arms each for supporting one or more liquid filter assemblies. A fluid conduit connected to the vacuum inlet port would extend up through each one of the support arms 25 to provide vacuum to all the liquid filter assemblies supported on the base 28.

Although various exemplary embodiments of the invention have been disclosed, it should be apparent to those skilled in the art that various changes and modifications can be made without departing from the spirit and scope of the invention. It is intended that such changes and modifications be covered by the following claims.

What is claimed is:

1. A liquid filtering system comprising:
   at least one filter assembly including:
      an upper sample reservoir for receiving a volume of sample liquid, a sample filter positioned proximate a bottom of the sample reservoir for mechanically filtering the sample liquid;
      a lower storage bottle for receiving filtered sample liquid from the sample reservoir; and
      a vacuum collar disposed between the sample reservoir and the storage bottle for directing a vacuum to below the sample filter so as to draw sample liquid through the sample filter into the storage bottle;
   a plurality of bases, at least one of the plurality of bases having a conduit for conducting a vacuum from a vacuum inlet port on the base to a vacuum outlet port in fluid communication with the vacuum collar, each of the plurality of bases supporting one of the at least one filter assemblies; and
   an auxiliary vacuum outlet port for providing the vacuum to additional devices, wherein a vacuum is connected from one of the bases to a vacuum collar on another of the bases.

2. A liquid filtering system according to claim 1, wherein each of the plurality of bases are weighted to reduce risk of tipping over.

3. A liquid filtering system according to claim 1, wherein the auxiliary vacuum port is integral with at least one of the plurality of bases.

4. A liquid filtering system according to claim 1, wherein the auxiliary vacuum port is integral with the vacuum collar.

5. A liquid filtering system according to claim 1, wherein a vacuum is connected from one of the bases to another of the bases.

6. A liquid filtering system according to claim 1, wherein a vacuum is connected from one of the vacuum collars in one of the filter assemblies to another one of the vacuum collars.

7. A liquid filtering system according to claim 1, further comprising a vacuum source connected to one of the bases, wherein the vacuum is further connected in a chain to all of the bases by vacuum connections from one of the bases to another of the bases.

8. A liquid filtering system according to claim 1, wherein the at least one filter assembly comprises a plurality of filter assemblies and at least one of the plurality of bases is adapted to receive and support the plurality of filter assemblies.

9. A liquid filtering system according to claim 8, wherein the conduit in the at least one of the plurality of bases further conducts the vacuum for communication with each of filter assemblies in the plurality of filter assemblies.

10. A liquid filtering system comprising:
a plurality of interconnected bases, each for supporting a filter assembly and having a vacuum inlet port and a vacuum outlet port for connection to the filter assembly, wherein at least one of the bases includes an auxiliary vacuum outlet port wherein each filter assembly includes:
i. an upper sample reservoir for receiving a volume of sample liquid;
ii. a sample filter positioned proximate a bottom of the sample reservoir for mechanically filtering the sample liquid;
iii. a lower storage bottle for receiving filtered sample liquid from the sample reservoir;
iv. a vacuum collar disposed between the upper sample reservoir and the lower storage bottle for applying the vacuum to the lower storage bottle; and
v. a vacuum port located on the vacuum collar and in fluid communication with the auxiliary vacuum outlet port of another base for providing a vacuum to the lower storage bottle to draw sample liquid through the sample filter into the storage bottle.

11. A liquid filtering system according to claim 10, wherein each of the bases is weighted to avoid tipping over.

* * * * *